United States Patent [19]
Tanaka et al.

[11] Patent Number: 5,999,202
[45] Date of Patent: *Dec. 7, 1999

[54] IMAGE FORMING APPARATUS AND IMAGE FORMING METHOD THAT CONCENTRATES EXPOSURE INTENSITY OF A LASER LIGHT OF EACH PICTURE ELEMENT

[75] Inventors: Takuto Tanaka; Toshie Gotoh, both of Nakai-machi, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/731,237

[22] Filed: Oct. 11, 1996

[30] Foreign Application Priority Data

Oct. 20, 1995 [JP] Japan ................... 7-296030

[51] Int. Cl.$^6$ ............... B41J 2/40; B41J 2/405
[52] U.S. Cl. ........................ 347/144; 347/131
[58] Field of Search .................. 347/131, 133, 347/143, 237, 247, 240, 252; 358/451, 528

[56] References Cited

U.S. PATENT DOCUMENTS 4,914,459  4/1990  Mama et al. ............... 347/131

FOREIGN PATENT DOCUMENTS 61-113018   5/1986  Japan.
4-336859   11/1992  Japan.
6-305189   11/1994  Japan.

*Primary Examiner*—N. Le
*Assistant Examiner*—L. Anderson
*Attorney, Agent, or Firm*—Oliff & Berridge PLC

[57] ABSTRACT

An image forming apparatus and an image forming method in which a latent image is formed by scanning the surface of an image bearing body with a laser light blinking in accordance with pulse-width modulation based on an image signal. Output-control-wave generating device generates an output control wave having a peak for a write time of each picture element. The output control wave is turned on and off by a gate circuit with timing determined by an exposure control signal generated by exposure control device. A signal output by the gate circuit is converted by a V/I converter into a driving current wave for controlling radiation of a laser light by an exposure unit. In this way, exposure energy produced by the exposure unit can be concentrated on an exposure time duration of each picture element, allowing the amount of mutual interference among picture elements to be reduced.

16 Claims, 18 Drawing Sheets

1 PICTURE ELEMENT

CLOCK SIGNAL

IMAGE SIGNAL AFTER D/A CONVERSION

CHOPPING WAVE

COMPARISON OF WAVEFORMS AT THE COMPARATOR

EXPOSURE CONTROL SIGNAL

OUTPUT CONTROL WAVE

CLOCK SIGNAL

DIFFERENTIAL WAVEFORM

ABSOLUTE VALUE

SAWTOOTH WAVE

IMAGE FORMING APPARATUS AND IMAGE FORMING METHOD THAT CONCENTRATES EXPOSURE INTENSITY OF A LASER LIGHT OF EACH PICTURE ELEMENT

BACKGROUND OF THE INVENTION

1. Field of the Invention

The present invention relates, in general, to an image forming apparatus and an image forming method using an electrophotographic process and, in particular, to an image forming apparatus and an image forming method for forming a latent image by scanning the surface of a photosensitive substance with a blinking laser light based on an image signal.

2. Description of the Related Art

In general, in an image forming apparatus using a digital image signal, first of all, a photosensitive material serving as an image bearing body is electrically charged uniformly. Then, a laser light which is modulated by an image signal in picture-element units is applied to the surface of the image bearing body to form an electrostatic latent image thereon. Portions of the image bearing body on which the laser light has been applied have different potentials depending upon the amount of laser light applied thereto. On the latent image, toner is selectively transferred to form a toner image which is then transferred and fixed onto paper to form a recorded image.

In an image forming apparatus like the one described above, as a method to expose the image bearing body with the amount of exposure determined by image data of each picture element, a technique applying pulse-width modulation on a laser is widely used. In this technique, the amount of exposure is varied for each picture element by changing the exposure time duration with the output of the laser light kept at a constant value. An image drawing apparatus shown in FIG. 14 is an example of an image forming apparatus which adopts the pulse-width modulation method. The device enclosed by a dashed line in the figure is an exposure control unit 100 for controlling the exposure of the image drawing apparatus. In the image drawing apparatus, image data output by an image processing unit 101 is converted into an analog voltage signal by a D/A converter 103 in synchronization with a clock signal of FIG. 15A generated by a clock-signal generator 102. On the other hand, a chopping-wave oscillator 104 generates a chopping wave which is also synchronized with the clock signal. The signal output by the D/A converter 103 is compared with the signal output by the chopping-wave oscillator 104 by a comparator 105 in order to convert the image data into an exposure control signal with a pulse width varying from picture element to picture element as shown in FIG. 15B. A V/I converter 106 carries out control to turn on and off a driving current wave of a light emitting device in accordance with the exposure control signal. The driving current wave output by the V/I converter 106 is constant during the exposure time duration of each picture element as shown in FIG. 15C.

A semiconductor laser 108, the light emitting device cited above, is driven by the driving current wave which is controlled to turn on and off by the V/I converter 106 as described above, radiating a laser light. The laser light is converted into parallel beams by a collimator lens 109 and then polarized by a polygon mirror 110 prior to adjustment of the focus and the scan speed thereof by an fθ lens 111 before being applied to the surface of an image bearing body 112. Thereafter, a latent image formed on the image bearing body 112 is made visible by the generally known electrophotographic process and recorded on paper.

Since a laser beam traditionally used in the image drawing apparatus described above has a large beam diameter, a beam spot produced at the exposure time duration juts out into adjacent picture elements as shown in FIG. 16, giving rise to mutual interference among picture elements. The interference much affects an intermediate-gradation image, causing a problem that an image cannot be reproduced with a high degree of fidelity. In order to solve this problem, it is thus necessary to reduce the beam diameter. In addition, it is also necessary to raise the resolution in order to reproduce an image constructed by thin lines such as a character with a high degree of fidelity. Also, in this case, the beam diameter of the laser light needs to be reduced. In order to reduce the beam diameter by means of an optical system comprising lenses and mirrors, however, the lens configuration becomes complex and, in addition, the size of the polygon mirror increases, naturally making the image drawing apparatus large in size.

In order to solve the problems described above, there is provided an image forming apparatus wherein the laser beam is squeezed into a smaller beam diameter by using means such as a diaphragm placed between the polygon mirror and the collimator lens for shielding part of the optical path of the laser light as is disclosed in Japanese Unexamined Patent Publication No. Sho 61-113018 (1986).

When the beam diameter is reduced physically as described above, however, diffraction of light occurring in the shielding means gives rise to fringes around a main beam spot as shown in FIG. 17A. Photographic fogs caused by the fringes in turn cause the picture quality to deteriorate. A technology developed to prevent the picture quality from deteriorating due to photographic fogs is disclosed in Japanese Unexamined Patent Publication No. Hei 6-305189 (1994).

According to an image forming method disclosed in Japanese Unexamined Patent Publication No. Hei 6-305189, an image bearing body having an photoelectric characteristic shown in FIG. 17B is used. As shown in FIG. 17B, as the exposure intensity (that is, the exposure energy) exceeds a certain fixed value (a), the surface potential drops steeply. Accordingly, when a laser light is applied to the surface of the image bearing body, the surface potential does not attenuate for an exposure intensity smaller than the value (a) and only the surface potential of exposure portions with an exposure intensity greater than the value (a) does attenuate. That is to say, since the amount of attenuation in surface potential of the photosensitive material is small for a range with an exposure intensity smaller than the value (a), effects of fringes shown in FIG. 17A can be suppressed, allowing only a large peak to become a predominant factor in the distribution of the surface-potential attenuation of the image bearing body.

According to an image forming method disclosed in Japanese Unexamined Patent Publication No. Hei 4-336859 (1992), on the other hand, by superposing two laser beams on each other as shown in FIG. 18, a beam dot with an amount of exposure larger than that produced by a single beam can be formed. Then, by using an image bearing body with the photoelectric characteristic described above, dots each having a size smaller than the beam diameter can be formed at a high density. The image bearing body exhibits an photoelectric characteristic that, at an amount of exposure produced by superposing two beams, that is, at an amount of exposure greater than the value (a), the surface potential drops abruptly.

With the image forming method described above, however, the following problems arise.

With the image forming method disclosed in Japanese Unexamined Patent Publication No. Hei 6-305189, effects of fringes can be suppressed theoretically by using the photoelectric characteristic of the image bearing body. It is difficult, however, to make an image bearing body that has an extremely accurate photoelectric characteristic like the one shown in FIG. 17B and also has practically durable stability and maintainability as well.

On the of that, the image forming method disclosed in Japanese Unexamined Patent Publication No. Hei 4-336859 has a quality-deterioration problem such as photographic fogs and poorly reproduced highlight portions which problem arises when the development bias voltage or the like changes in addition to the problem described above. By the same token, there is a factor limiting the improvement of the resolution if the beam diameter is not reduced. In addition, since there is much mutual interference among picture elements, a complex image processing is required. As a result, there are a number of problems encountered in putting the image drawing apparatus to practical use.

SUMMARY OF THE INVENTION

The present invention addresses the problems described above. It is thus an object of the present invention to provide an image forming apparatus and an image forming method which can reproduce an intermediate gradation and a thin line well by concentrating the exposure intensity of a laser light on each picture element.

According to one aspect of the present invention, in order to solve the problems described above, there is provided an image forming apparatus comprising: an image bearing body comprising a conductive layer and a photosensitive layer formed on the conductive layer; an electrical charging unit for electrically charging the surface of the image bearing body substantially uniformly; an image drawing unit for forming an electrostatic latent image on the image bearing body by scanning the surface of the image bearing body with a light beam modulated by an image signal for each picture element; and development means for making the electrostatic latent image visible by selectively transposing development agent onto the image bearing body, wherein the image drawing unit comprises: output-control-wave generating means for generating a control wave having one peak in a write time of each picture element in the scanning operation by the light beam; a V/I converter for converting the control wave output by the output-control-wave generating means into a driving current wave for driving a light emitting device for generating the light beam; and exposure control means for setting the exposure time duration of each picture element in accordance with the image signal and for controlling the exposure so that the peak of the output control wave is positioned in the exposure time duration.

According to another aspect of the present invention, there is provided an image forming method comprising: a process of electrically charging substantially uniformly the surface of an image bearing body comprising a conductive layer and a photosensitive layer formed on the conductive layer; a process of forming an electrostatic latent image on the image bearing body by scanning the surface of the image bearing body with a light beam modulated by an image signal for each picture element; and a process of making the electrostatic latent image visible by selectively transposing development agent onto the image bearing body, wherein a driving current wave for driving a light emitting device for generating the light beam is controlled so that the driving current wave has one peak in a write time of each picture element and the exposure time duration of each picture element is set so that the peak is positioned in the exposure time duration of each picture element.

In the present invention, any output control waveform can be selected appropriately as long as the waveform has only one relatively sharp peak within a write time of each picture element. The waveform can be a waveform obtained by performing an operation such as rectification, polarity inversion or superposition of a direct-current component on a sinusoidal wave, a chopping wave, a differential waveform of a square wave or an integral waveform of a chopping wave.

By providing the configurations described above, the image forming apparatus and the image forming method respectively of the invention have effects described as follows.

In the image forming apparatus according to the invention, the output-control-wave generating means is provided for producing a waveform with one peak in a write time of each picture element and a control wave output by the output-control-wave generating means is converted by the V/I converter into a driving current wave of the light emitting device which driving current wave has only one peak in the write time of each picture element. In addition, the exposure control means is provided for setting the exposure time duration of each picture element in accordance with an image signal and for controlling the exposure so that the peak of the output control wave is positioned in the exposure time duration. In this way, the output of the light emitting device can have a peak in the exposure time duration of each picture element. Thus, the exposure energy can be concentrated in the exposure time duration of the image bearing body and the distribution of the exposure intensity can be made sharper. As a result, the amount of mutual interference among picture elements can be reduced, a latent image can be formed from dots with a dot in a picture element being all but independent of dots in other picture elements and the reproducibility of an intermediate gradation and a thin line can be enhanced.

In the image forming method according to the invention, a driving current wave for driving the light emitting device for generating a light beam is controlled so that the driving current wave has one peak in a write time of each picture element and the exposure time duration of each picture element is set so that the peak is positioned in the exposure time duration of each picture element. It is thus possible to control the amount of exposure of the light emitting device so that each picture element has a peak at a location therein. Accordingly, the exposure energy can be concentrated in the exposure time duration of the image bearing body and the distribution of the exposure intensity can be made sharper. As a result, the amount of mutual interference among picture elements can be reduced, a latent image can be formed from dots with a dot in a picture element being all but independent of dots in other picture elements and the reproducibility of an intermediate gradation and a thin line can be enhanced.

DESCRIPTION OF THE PREFERRED EMBODIMENTS

The present invention will become more apparent from the following detailed description of some preferred embodiments with reference to the accompanying diagrams showing the embodiments.

Figure 1:
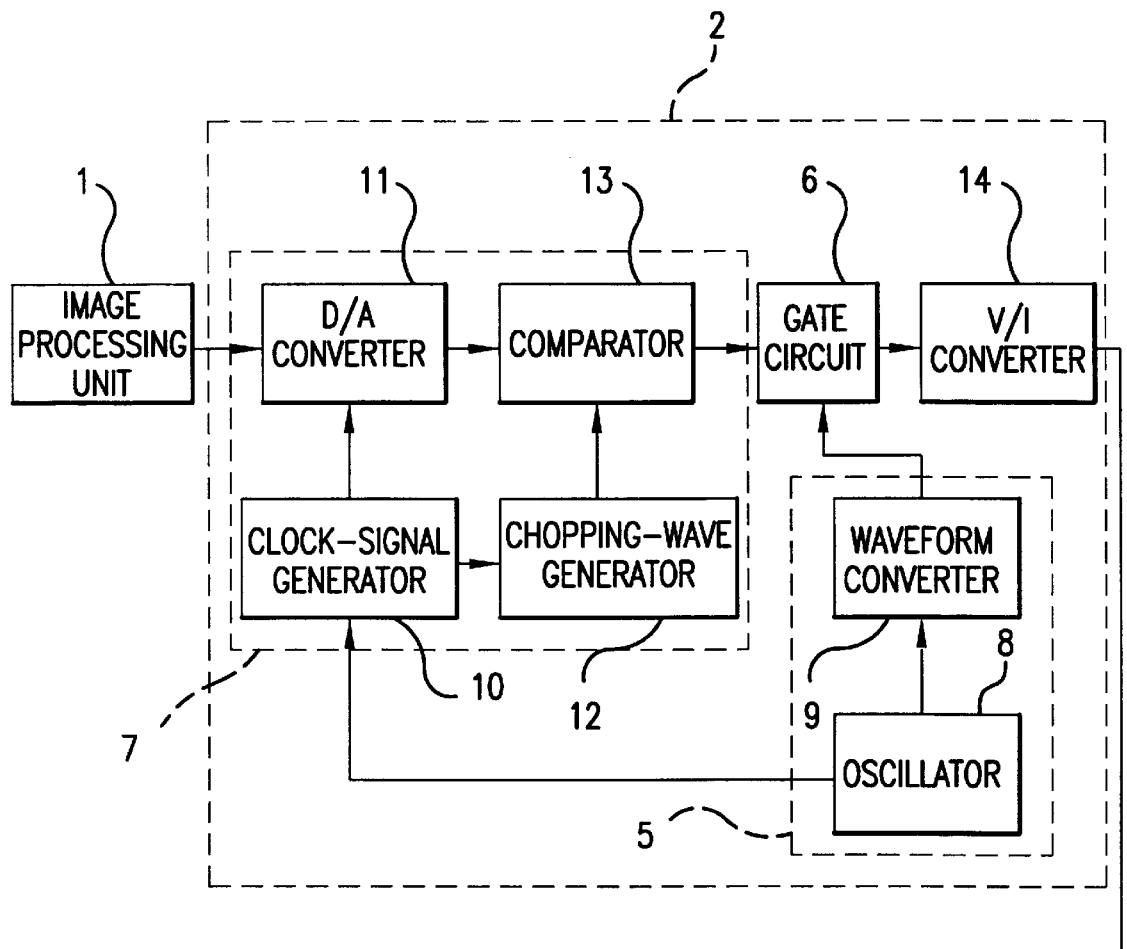
FIG. 1 is a schematic configuration diagram showing an image forming apparatus provided by a first embodiment of the present invention.
Figure 1:
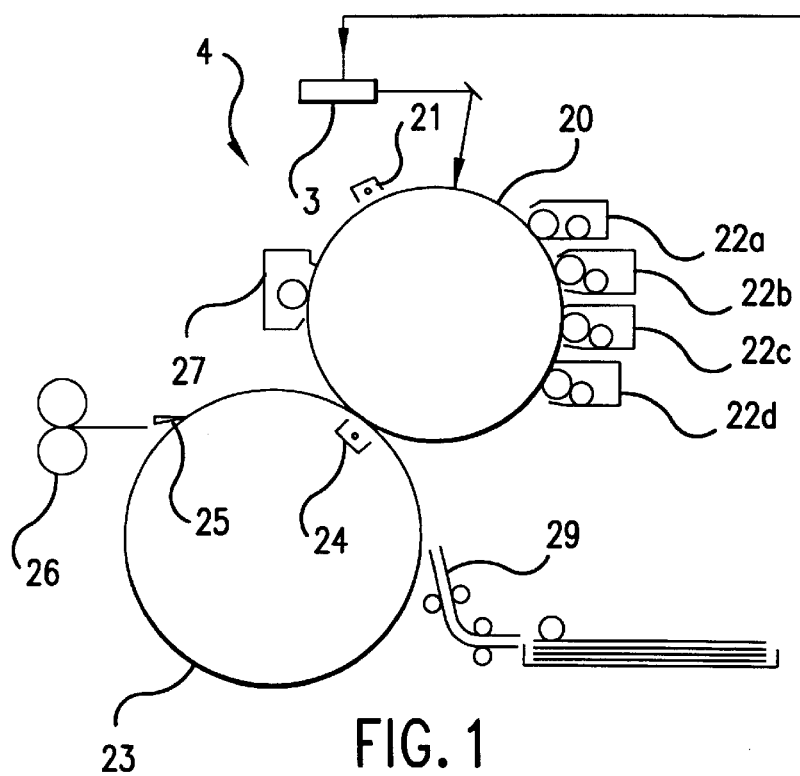

FIG. 1 is a schematic configuration diagram and a block diagram showing an image forming apparatus provided by a first embodiment according to the present invention.

As shown in the figure, the image forming apparatus comprises: an image processing unit 1 for carrying out processings such as conversion of an image signal transmitted from an image information source like a manuscript reading device into a color signal, gradation analyses and concentration correction; an image drawing control unit 2 for carrying out pulse-width modulation based on the processed image signal output by the image processing unit for each picture element; an exposure unit 3 for radiating a laser light to an image bearing body in accordance with a signal input from the image drawing control unit 2; and an image forming unit 4 for forming a recorded image by development of a portion of the image bearing body to which the laser light is radiated. It should be noted that the image drawing control unit 2 and the exposure unit 3 constitute an image writing unit.

The image drawing control unit 2 comprises: output-control-wave generating means 5 for generating an output control wave having one peak in a write time of each picture element in the scanning operation by the laser light; exposure control means 7 for setting the exposure time duration of each picture element; a gate circuit 6 for turning on and off the output control wave; and a V/I converter 14 for converting a waveform output by the gate circuit 6 into a driving current wave.

Figure 2A:
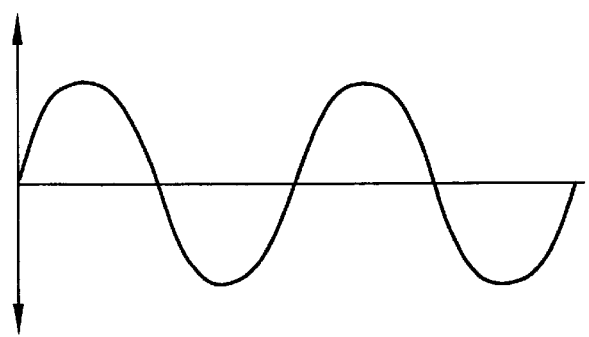
FIGS. 2A to 2D are diagrams showing waveforms generated by output-control-wave generating means employed in the image forming apparatus shown in FIG. 1.
Figure 2B:
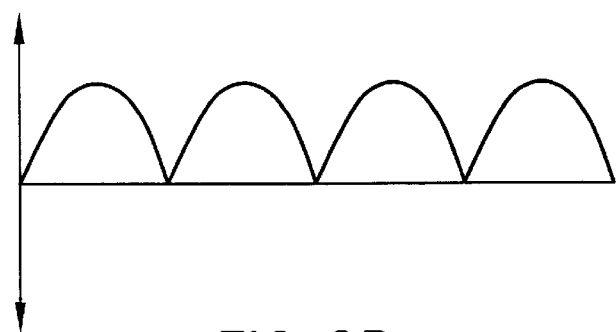
Figure 2C:
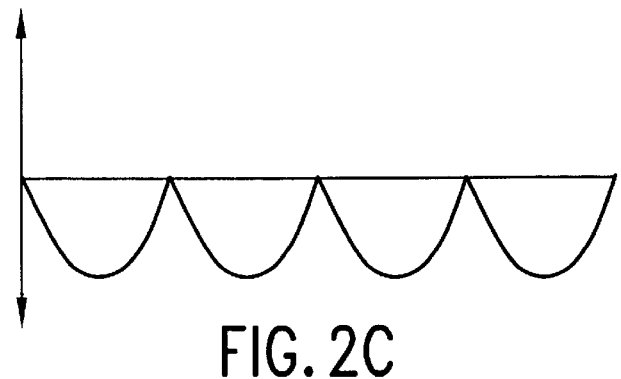
Figure 2D:
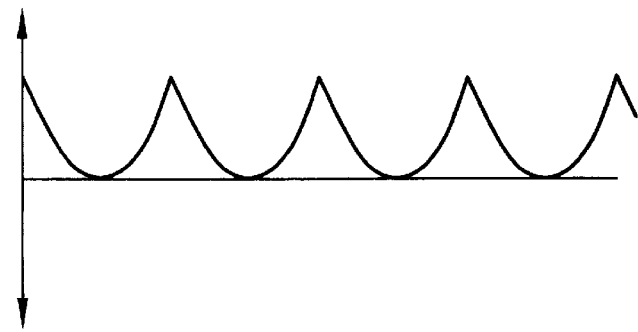
Figure 3A:
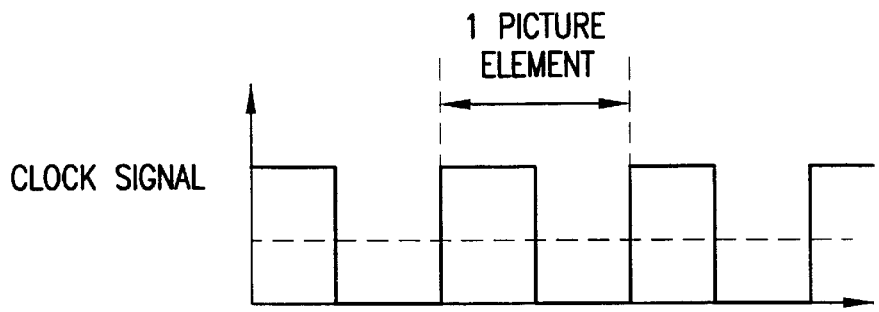
FIGS. 3A to 3F are diagrams showing a clock signal, a D/A-converted image signal, a chopping wave, comparison between the image signal and the chopping wave, an exposure control signal and an output control wave to be applied to a light emitting device employed in the image forming apparatus shown in FIG. 1.

The output-control-wave generating means 5 comprises an oscillator 8 for outputting a sinusoidal wave synchronized to a clock signal shown in FIG. 2A generated by a clock-signal generator 10 and a waveform converter 9 for shaping the sinusoidal wave generated by the oscillator 8 into a desired waveform. To be more specific, the sinusoidal wave output by the oscillator 8 is first converted into a rectified waveform shown in FIG. 2B. Then, the polarity of the rectified waveform is inverted to produce an absolute-value waveform shown in FIG. 2C. Finally, the inverted waveform is superposed on a direct-current component to result in a waveform with sharp peaks as shown in FIG. 2D. The clock-signal generator 10 produces a clock signal shown in FIG. 3A, setting write timing for each picture element. By synchronizing the signal output by the oscillator 8 with the clock signal produced by the clock-signal generator 10, the waveform generated by the waveform converter 9 can be set so that the waveform has a peak in a write time for each picture element.

Figure 3B:
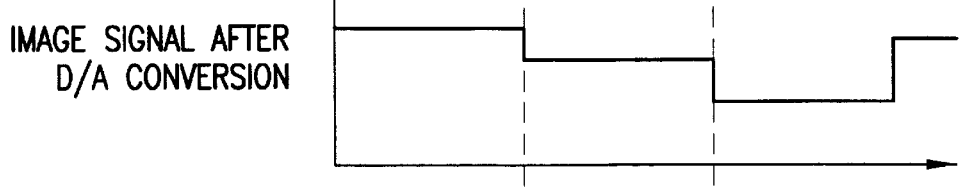
Figure 3C:
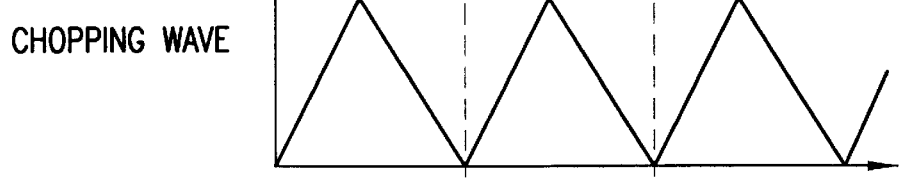
Figure 3D:
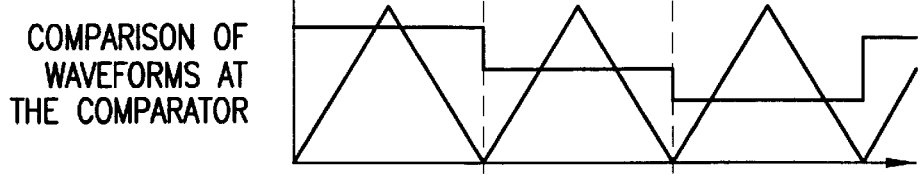

As shown in FIG. 1, the exposure control means 7 comprises: the clock-signal generator 10 cited above, a D/A converter 11 for converting a digital image signal received from the image processing unit 1 into an analog image signal representing voltage values shown in FIG. 3B; a chopping-wave generator 12 for generating a chopping wave like the one shown in FIG. 3C; and a comparator 13 for comparing the analog image signal received from the D/A converter 11 with the chopping wave output by the chopping-wave generator 12 as shown in FIG. 3D. In this way, the analog image signal is used to carry out pulse-width modulation, being converted into an exposure control signal shown in FIG. 3E.

The gate circuit 6 has the output thereof turned on and off by the exposure control signal which is a train of rectangular pulses. To put it in detail, when the exposure control signal is high, the control wave output by the output-control-wave generating means 5 is turned on. When the exposure control signal is low, on the other hand, the control wave output by the output-control-wave generating means 5 is turned off.

The V/I converter 14 converts the output control wave produced by the gate circuit 6, a voltage wave, into a driving current wave.

The exposure unit 3 comprises, among other components, a semiconductor laser, a collimator lens, a polygon mirror and an fθ lens. The semiconductor laser is driven by the image signal output by the image drawing control unit 2, to be more specific, the driving current wave output by the V/I converter 14, to radiate a laser light. The laser light is polarized by the polygon mirror and applied to the image bearing body after the scanning speed and the focus thereof have been corrected.

Figure 3E:
Figure 3F:
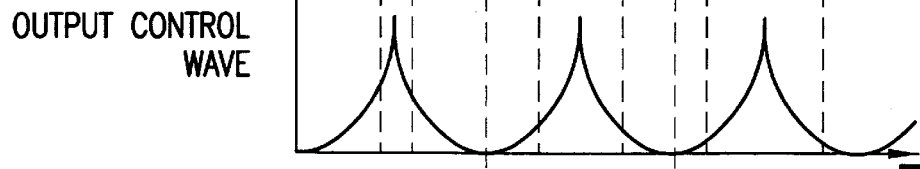
Figure 4:
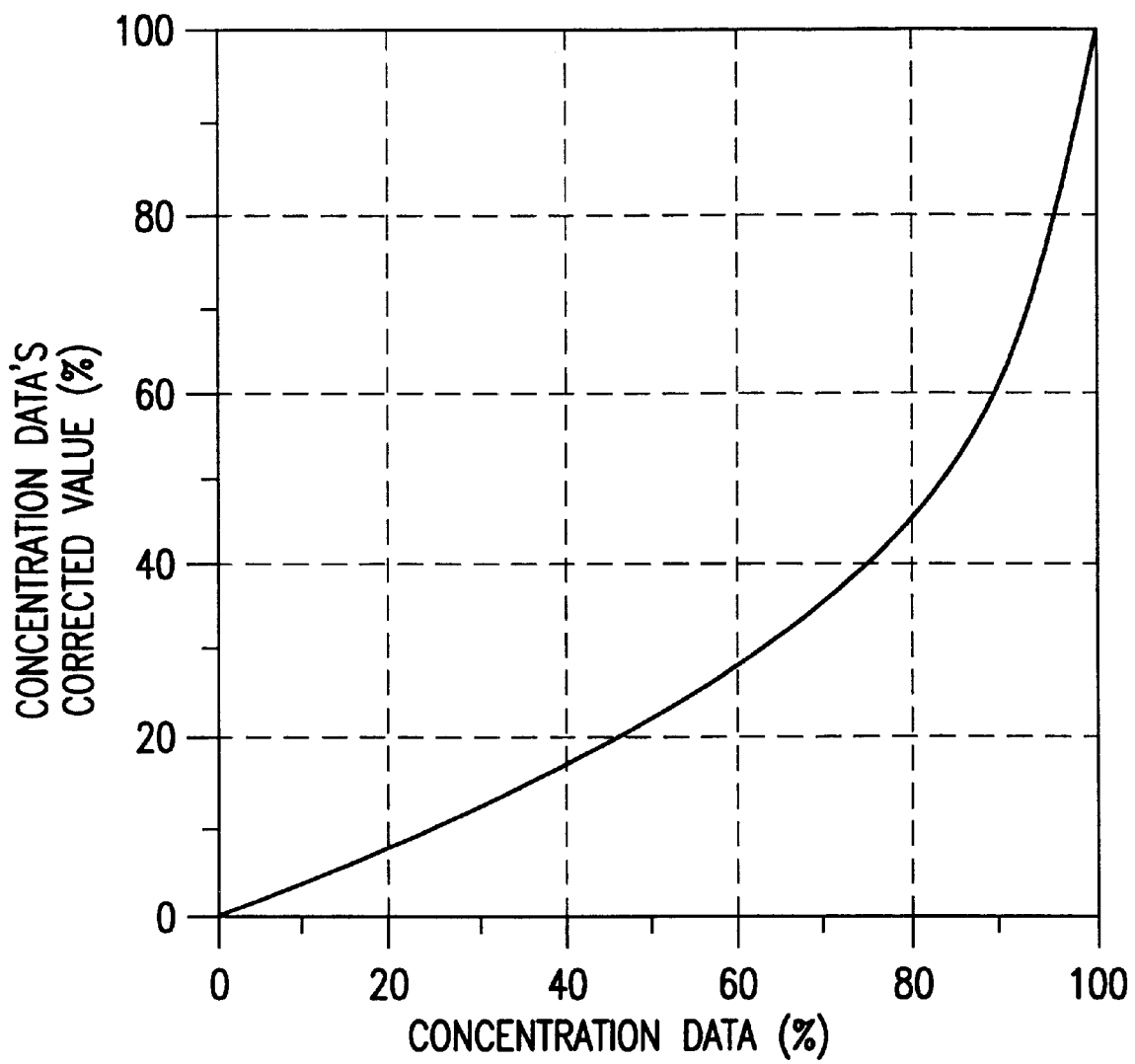
FIG. 4 is a diagram showing a correction curve used for concentration data used in the image forming apparatus shown in FIG. 1.

Addressing the problem that the exposure time duration is not proportional to the amount of exposure of the exposure unit 3 determined by the output control wave as shown in FIG. 3F, the image processing unit 1 also corrects concentration data to result in an appropriate exposure in addition to processings such as conversion of an image signal into a color signal and gradation analyses. That is to say, correction values for correcting concentration data based on the concentration data of a manuscript are set to give desired concentrations as shown in FIG. 4. In this way, an exposure control signal with pulse widths set in accordance with the correction values of the concentration data can be generated to result in a recorded image with an appropriate concentration.

The image signal conveys a concentration value for each picture element and the exposure control means 7 has exposure-time-duration determining means for determining an exposure time duration of the image signal for each picture element in accordance with the concentration value for the picture element. The gate circuit 6 determines such write timing of the image drawing unit that each peak of the output control wave is placed in the exposure time duration determined by the exposure-time-duration determining means during the exposure time duration of a picture element.

An output control wave with a flat portion in the exposure time duration will work all right. However, a number of output control waveforms with a peak in each exposure duration time are also possible. For example, each peak of an output control wave is located in the middle, at the front part or at the rear part of the exposure time duration of each picture element as shown in FIG. 3. If the peak of an output control wave is located at the front part or at the rear part of the exposure time duration of each picture element, the exposure energy of a specific picture element may most likely affect adjacent picture elements. However, since it is unlikely that exposure energies of adjacent picture elements affect each other, the effect on the actual picture is not a thing to worry about.

The image processing unit 1 has concentration correcting means for correcting the concentration values conveyed by the image signal. The concentration correcting means makes exposure energy of the output control wave in the exposure time duration determined by the exposure-time-duration determining means equal to exposure energy of a constant output wave having no peak in the exposure time duration. To be more specific, the concentration correcting means has the reciprocal of a ratio of exposure energy of the output control wave in the exposure time duration determined by the exposure-time-duration determining means to exposure energy of a constant output wave having no peak in the exposure time duration for each concentration value.

In the case of this embodiment, the concentration correcting means is merely added so that only few changes need to be made to the image inputting unit and the image processing unit. As a matter of fact, a correction curve of the concentration correcting means represents a relation of the concentration data and the corrected concentration obtained by subtracting a value from the concentration data as shown in FIG. 4. This is because, since the exposure time duration of the pre-correction image signal of the image processing unit is used as it is, the exposure time duration is determined by a constant output wave with no peak in the exposure time duration so that the exposure energy determined by the exposure time duration for a chopping control wave provided by the present invention will exceed a predetermined value. It is thus necessary to make the exposure energy of a turned-on output control wave in the exposure time duration determined by the exposure-time-duration determining means equal to exposure energy of a constant output wave having no peak in the exposure time duration by setting the peak value of the output control wave having peaks at a level higher than the constant output value of the constant output wave with no peaks. When an exposure time duration is determined so that the peak of an output control wave is positioned in the exposure time duration, the resulting exposure energy tends to exceed the exposure energy of a constant output wave. The concentration correcting means is intended to prevent the exposure energy of an output control wave from exceeding the exposure energy of a constant output wave. As a result, the concentration correcting means allows the desired exposure energy of the image signal to be generated accurately from the exposure energy prior to the concentration correction.

The image processing unit 4 comprises: an image bearing body 20 wherein a laser light is radiated to the surface thereof after being electrically charged uniformly in order to form a latent image on the surface; an electrical charging unit 21 for providing uniform electrical charge to the surface of the image bearing body 20; four development units 22a, 22b, 22c and 22d for accommodating toner of the yellow, magenta, cyan and black colors respectively for use in the development of a latent image on the image bearing body 20; a rotary transcription drum 23 installed at a location facing the image bearing body 20 for bearing paper supplied from a paper guide 29 on the surface thereof; a transcription electrical charger 24 for transcribing a toner image onto the paper borne by the rotary transcription drum 23; a peeling unit 25 for peeling off the transcribed paper from the rotary transcription drum 23; a fixing unit 26 for fixing the toner image on the paper peeled off from the rotary transcription drum 23; and a cleaning unit 27 for removing residual toner from the image bearing body 20 after the transcription process.

Next, an image forming method provided by the first embodiment of the present invention which method is adopted for carrying out the operation of the image forming apparatus is explained.

First of all, an image signal transmitted from an image information source not shown in the figure undergoes processings such as conversion into a color signal and a gradation analysis in addition to correction of the concentration data thereof based on a curve shown in FIG. 4 in the image processing unit 1. Then, image data output by the image processing unit 1 is supplied to the D/A converter 11 with timing determined by the clock signal shown in FIG. 3A to be converted into an analog voltage signal. At the same time, a chopping wave is generated by the chopping-wave generator 12 in synchronization with the clock signal generated by the clock-signal generator 10. The analog voltage signal produced by the D/A converter 11 is compared by the comparator 13 with the chopping wave output by the chopping-wave generator 12 to generate an exposure control signal shown in FIG. 3E. As shown in FIG. 3E, the exposure control signal is a train of pulses with pulse widths each representing an amount of exposure.

On the other hand, the oscillator 8 employed in the output-control-wave generating means 5 produces a sinusoidal wave in synchronization with the clock signal output by the clock-signal generator 10. The sinusoidal wave output by the oscillator 8 is processed by the waveform converter 9, being converted into a control wave with a waveform shown in FIG. 2D. As shown in FIG. 2D, the waveform of the control wave produced by the waveform converter 9 has a peak in a write time of each picture element.

Subsequently, the control wave generated by the output-control-wave generating means 5 is supplied to the gate circuit 6 to be turned on and off with timing determined by the exposure control signal produced by the exposure control means 7. A signal output by the gate circuit 6 is then converted by the V/I converter 14 into a driving current wave for driving the exposure unit 3.

The driving current wave produced by the image drawing control unit 2 is supplied to the exposure unit 3 for driving the semiconductor laser employed therein. Driven by the driving current wave, the semiconductor laser generates a laser light which is blinking with predetermined timing and a predetermined quantity of light. After being polarized by the polygon mirror, the laser light is radiated to the image bearing body 20. The control of the exposure of the exposure unit 3 employed in the image writing unit, which also includes the image drawing control unit 2 connected in series to the exposure unit 3, is carried out in an interlocked manner with the operation of the image forming unit 4 for the yellow, magenta, cyan and black colors sequentially one color after another.

On the other hand, the surface of the image bearing body 20 employed in the image forming unit 4 is electrically charged uniformly by the electric charging unit 21. A laser light for a yellow image transmitted by the exposure unit 3 is radiated to the image bearing body 20 in order to form a yellow latent image on the surface of the image bearing body 20. Then, a development electric field is generated between the image bearing body 20 and the development unit 22a for the yellow color, causing toner having electric charge to be transferred selectively to the image bearing body 20 to develop the yellow toner image. At that time, the laser light is applied to an image portion on the surface of the image bearing body 20 to draw an image thereon and toner having electric charge with the same potential polarity as the potential polarity of the surface of the image bearing body 20 is transferred to the image portion on the surface of the image bearing body 20, to which the laser light is applied, forming a toner image. The toner image is brought into contact with paper electrostatically stuck to the circumference surface of the transcription drum 23 at a location facing the transcription drum 23 and transcribed to the paper by an effect produced by the transcription electrical charger 24. On the other hand, residual toner left on the surface of the image bearing body 20 after the transcription process is removed by the cleaning unit 27. Thereafter, the surface of the image bearing body 20 is again electrically charged uniformly by the electric charging unit 21. Likewise, a laser light for a magenta image transmitted by the exposure unit 3 is radiated to the image bearing body 20 in order to form a magenta latent image on the surface of the image bearing body 20. Then, similarly, a development electric field is generated between the image bearing body 20 and the development unit 22b for the magenta color, causing toner having electric charge to be transferred selectively to the image bearing body 20 to develop the magenta toner image. The developed magenta toner image is then transcribed to the paper borne by the transcription drum 23, being superposed on the yellow toner image.

By the same token, processes to form a cyan toner image and a black toner image are then carried out one after another to produce a multicolor toner image by superposing the yellow, magenta, cyan and black toner images on the paper borne by the transcription drum 23. The paper is then peeled off from the transcription drum 23 and heated and pressed by the fixing unit 27 for fixing the multicolor toner image on the paper. In this way, the process to form a recorded image is completed.

In the image forming apparatus described above, the light emitted by the exposure unit 3 is controlled by putting each of the peaks of the output control wave in the exposure time duration for every picture element as shown in FIG. 3F. Thus, exposure energy can be concentrated at a specific location in the exposure range of each picture element. As a result, the distribution of the exposure intensity can be made sharp. Next, results of a test carried out to verify the exposure state of the image bearing body 20 by using the image forming apparatus are shown.

Figure 5:
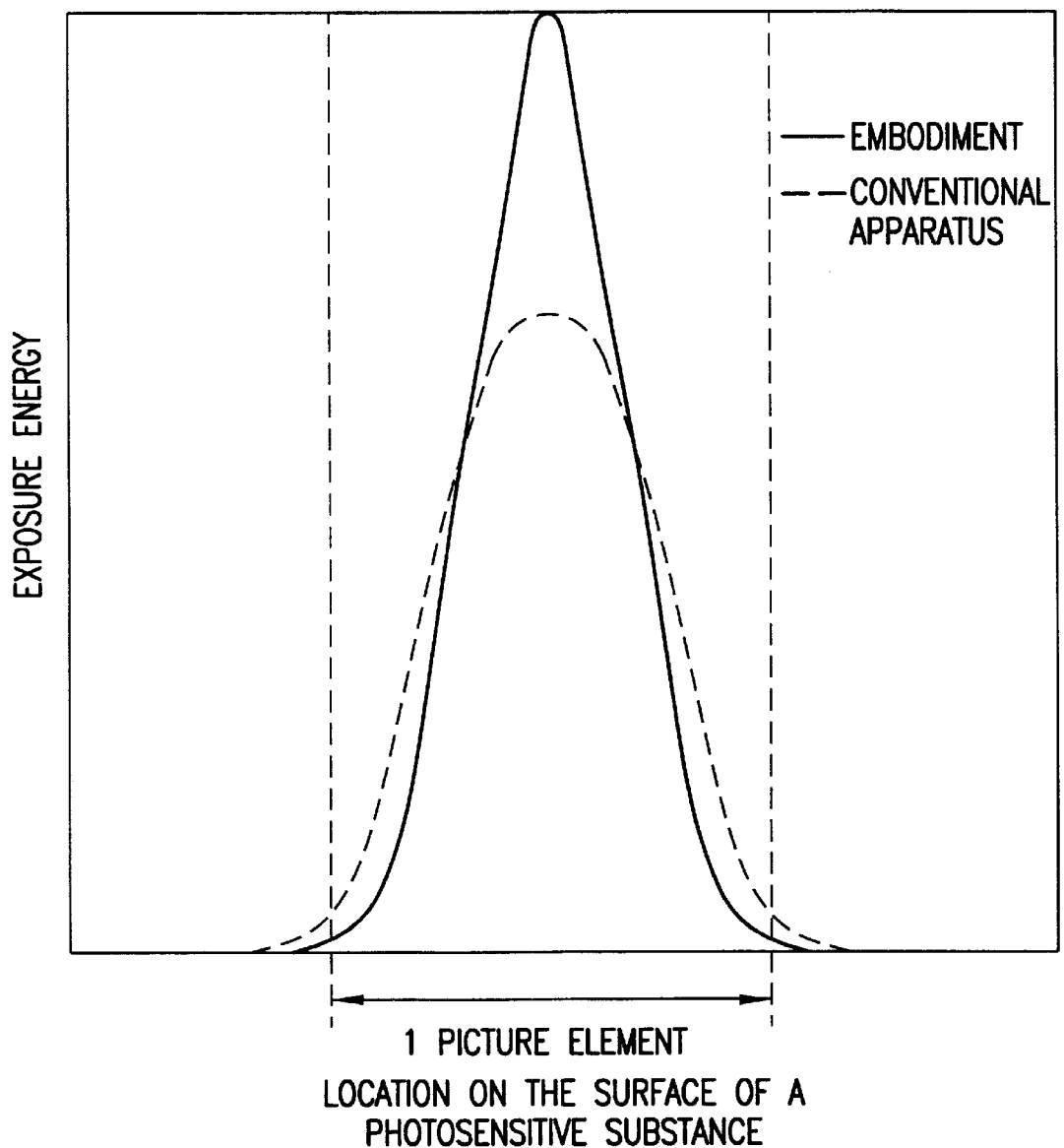
FIG. 5 is a diagram showing a distribution of exposure intensity of an image bearing body employed in the image forming apparatus shown in FIG. 1.

FIG. 5 shows a distribution of the exposure intensity of an image bearing body at a concentration of 50%. In comparison with the distribution of the exposure intensity obtained with the conventional image forming apparatus, FIG. 5 verifies a distribution wherein a sharp peak appears at a location in each picture element. The distribution is all but the same as the distribution of the exposure intensity obtained from an exposure process in the conventional image forming apparatus with a laser light having a beam diameter reduced by about 30%. On the top of that, it is obvious from such a sharp distribution of the exposure intensity that the effect on adjacent picture elements is small.

Figure 6B:
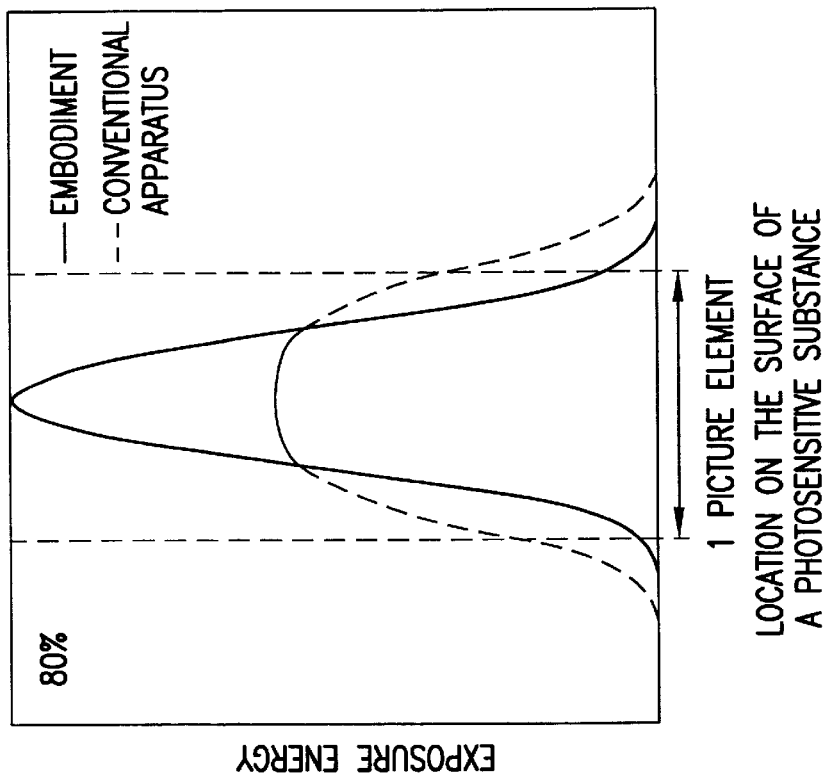
FIGS. 6A and 6B are diagrams each showing a distribution of exposure intensity of an image bearing body employed in the image forming apparatus shown in FIG. 1.
Figure 6A:
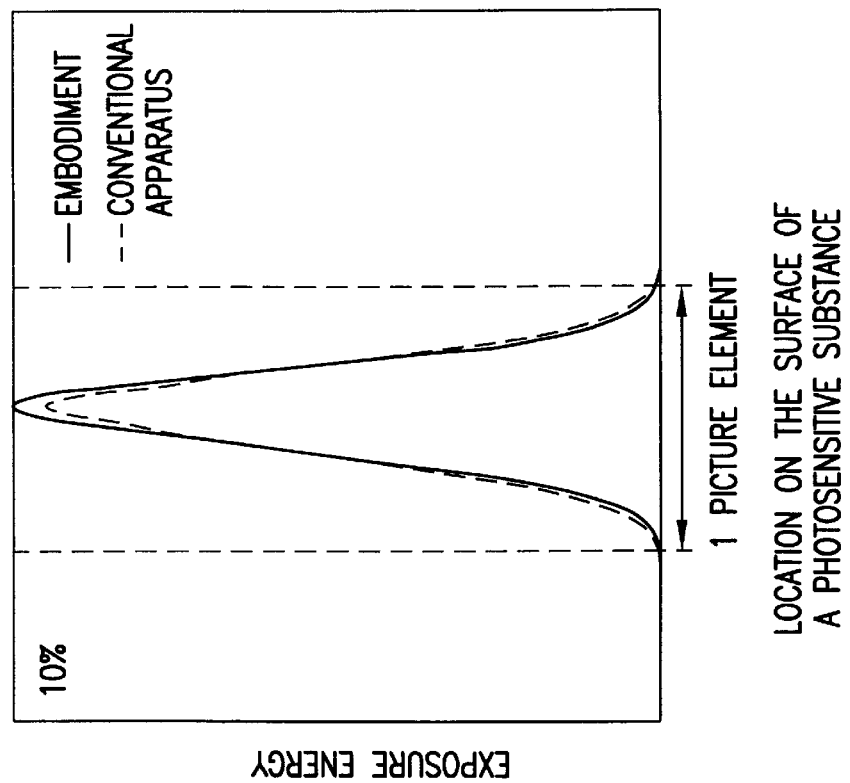

FIGS. 6A and 6B are diagrams showing distributions of the exposure intensity at concentrations of 10% and 80%. The distributions are drawn so that both of them have the same peak value. In the case of the conventional image forming apparatus, the higher the concentration, the bigger the effect on adjacent picture elements. In the case of the image forming apparatus provided by the present invention, on the other hand, even at a concentration of 80%, it has been verified that the amount of mutual interference among picture elements is small as is obvious from these diagrams. As a result, a latent image can be formed clearly and distinctly from dots with a dot in a picture element being all but independent of dots in other picture elements to result in a final good recorded image with good reproducibility of intermediate gradations and thin lines thereof. On top, of that, effects of fringes which are generated when the laser light is physically squeezed by shielding means are eliminated and the generation of photographic fogs and the deterioration of the reproducibility of highlight portions disappear.

Figure 7:
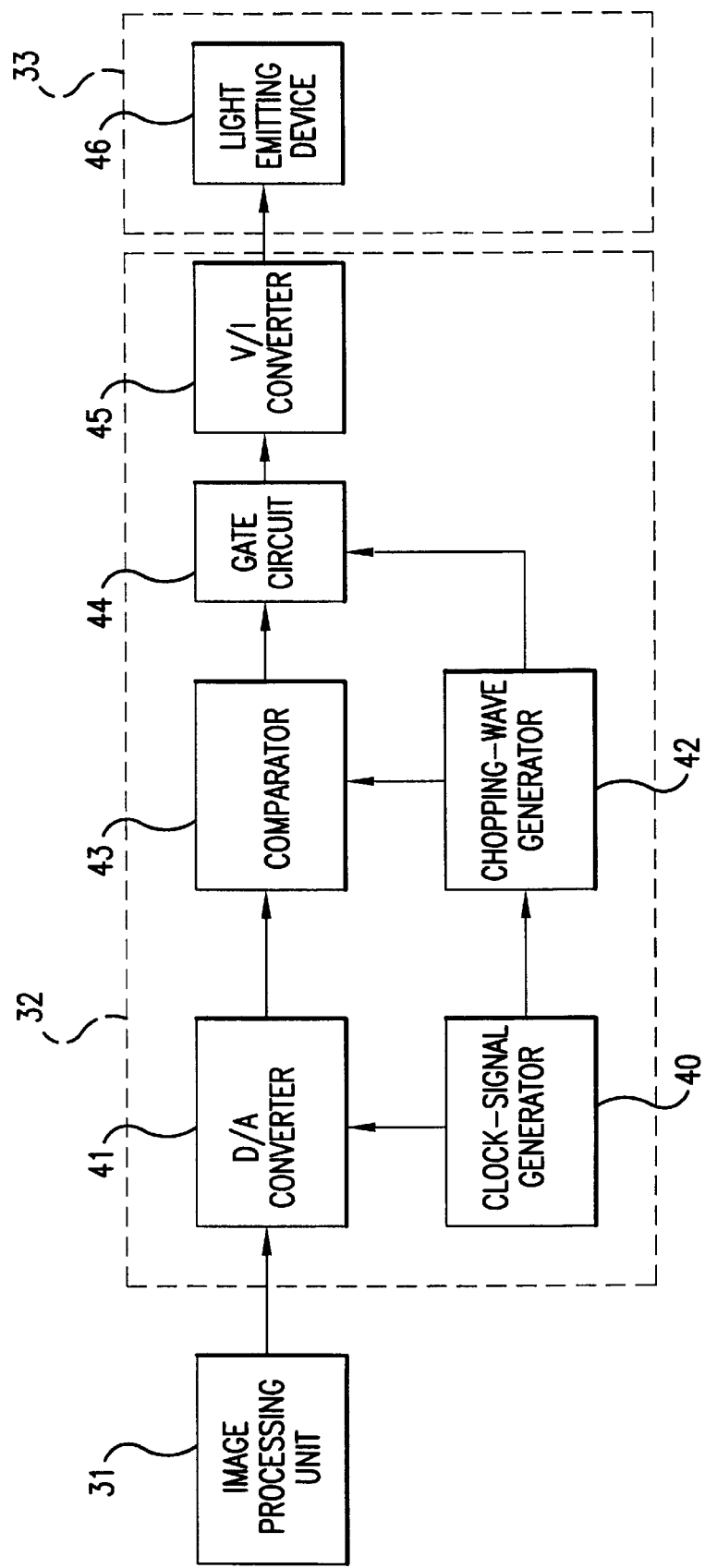
FIG. 7 is a block diagram showing an image drawing control unit employed in an image forming apparatus provided by a second embodiment of the present invention.

FIG. 7 is a block diagram showing an image drawing control unit 32 employed in an image forming apparatus provided by a second embodiment of the present invention.

In this image drawing control unit 32, a chopping-wave generator 42 for generating a chopping wave synchronously with a clock signal output by a clock-signal generator 40 is employed to serve also as output-control-wave generating means in place of the output-control-wave generating means 5 employed in the first embodiment. That is to say, the signal output by the chopping-wave generator 42 is used as the output control wave. In addition to the chopping-wave generator 42 and the clock-signal generator 40, the image drawing control unit 32 also includes a D/A converter 41, a comparator 43, a gate circuit 44 and a V/I converter 45 which have the same configurations as those shown in FIG. 1.

Figure 8A:
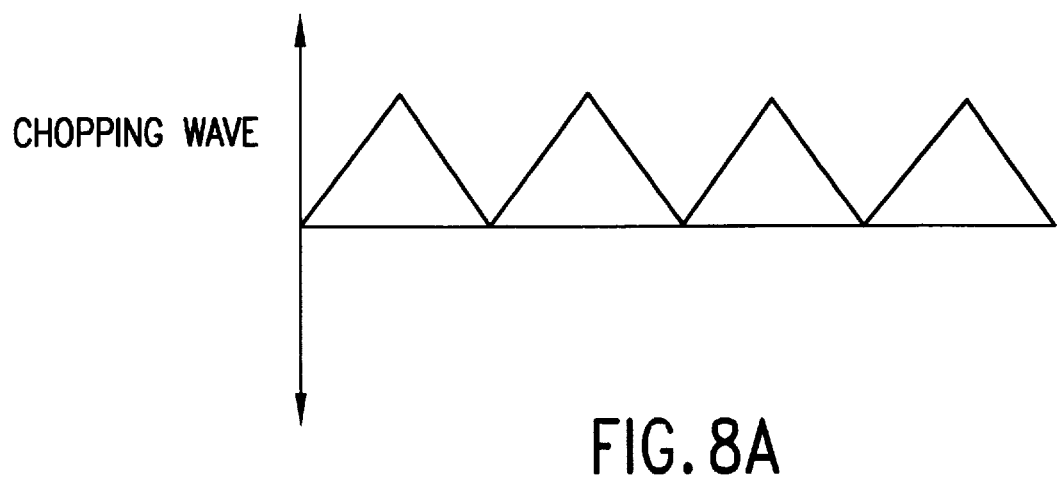
FIGS. 8A and 8B are diagrams each showing an output control wave to be applied to a light emitting device employed in the image forming apparatus shown in FIG. 7.

The chopping-wave generator 42 outputs a chopping wave like one shown in FIG. 8A. However, the chopping-wave generator 42 can be set to produce a sawtooth wave like one shown in FIG. 8B.

It should be noted that the remaining configuration of the image forming apparatus is the same as that of the image forming apparatus shown in FIG. 1.

Next, an image forming method provided by the second embodiment of the present invention which method is adopted for carrying out the operation of the image forming apparatus is explained.

First of all, an image signal output by an image processing unit 31 is converted into an analog image signal by the D/A converter 41. At the same time, the chopping-wave generator 42 generates a chopping wave in synchronization with a clock signal output by the clock-signal generator 40 as shown in FIG. 8A. The analog image signal is compared with the chopping wave by the comparator 43 to produce an exposure control signal with pulse widths each representing an amount of exposure.

The chopping wave output by the chopping-wave generator 42 also functions as an output control wave which is turned on and off by the gate circuit 44 with timing determined by the exposure control signal produced by the comparator 43. The output control wave produced by the gate circuit 44 is then converted by the V/I converter 45 into a driving current wave for driving a light emitting device 46 employed in the exposure unit 3. Driven by the driving current wave, the light emitting device 46 radiates a blinking laser light which is used for scanning the surface of an image bearing body in order to form a latent image thereon. Thereafter, an electrophotographic process is carried out to form a recorded image on paper in the same way as the image forming apparatus shown in FIG. 1.

Figure 9:
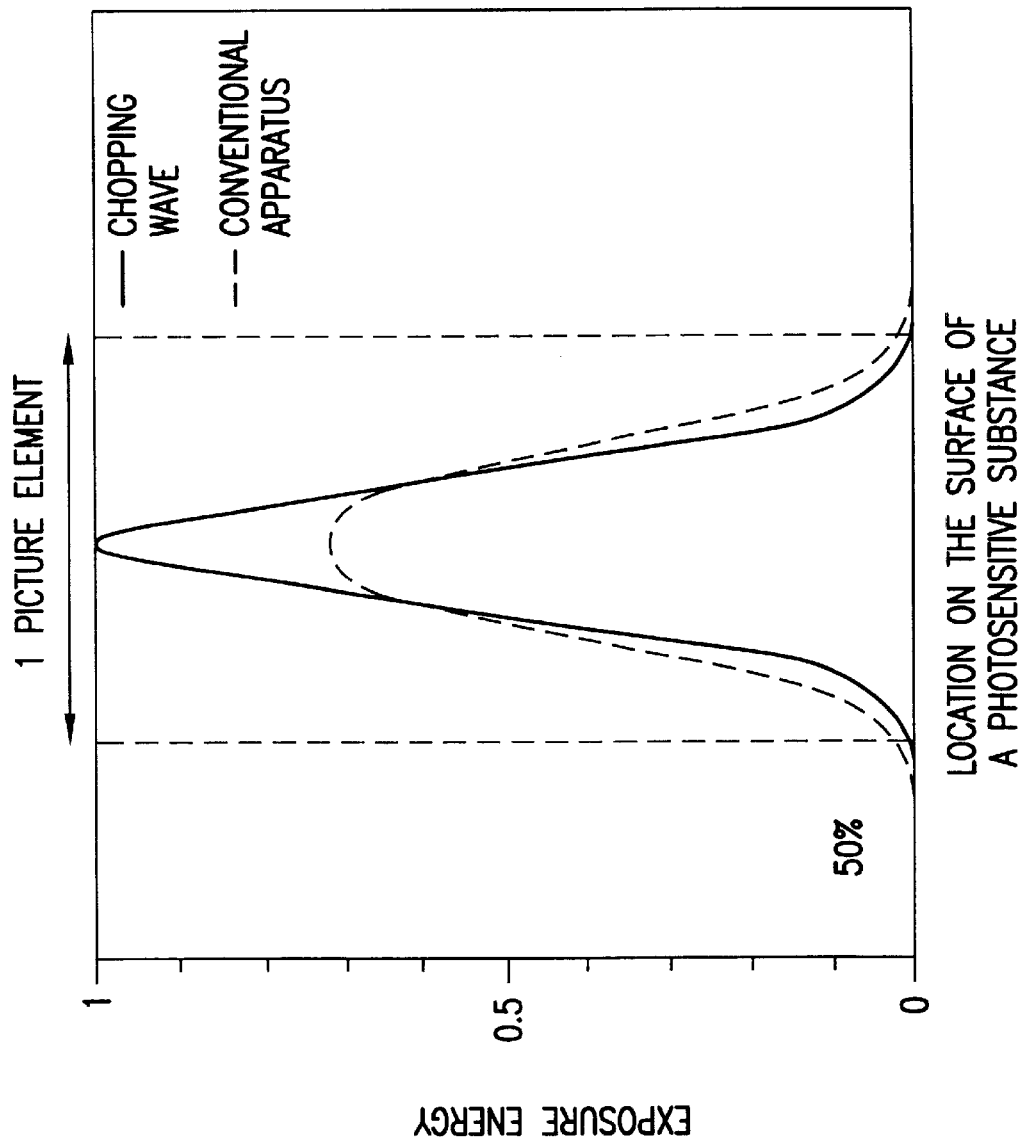
FIG. 9 is a diagram showing a distribution of exposure intensity of an image bearing body employed in the image forming apparatus employing the image drawing control unit shown in FIG. 7.

FIG. 9 is a diagram showing the distribution of the exposure intensity for the image bearing body employed in this image forming apparatus.

As is obvious from the figure, it is verified that a distribution of the exposure intensity with a sharp peak located at a position in close proximity to the center of each picture element is obtained in comparison with the conventional image forming apparatus. For this reason, a dot written on a picture element on the surface of the image bearing body is all but independent of dots on other picture elements, allowing the amount of mutual interference among adjacent picture elements to be reduced. In this way, a latent image can be formed clearly and distinctly. As a result, an image with good reproducibility of intermediate gradations and thin lines can be obtained.

Figure 8B:
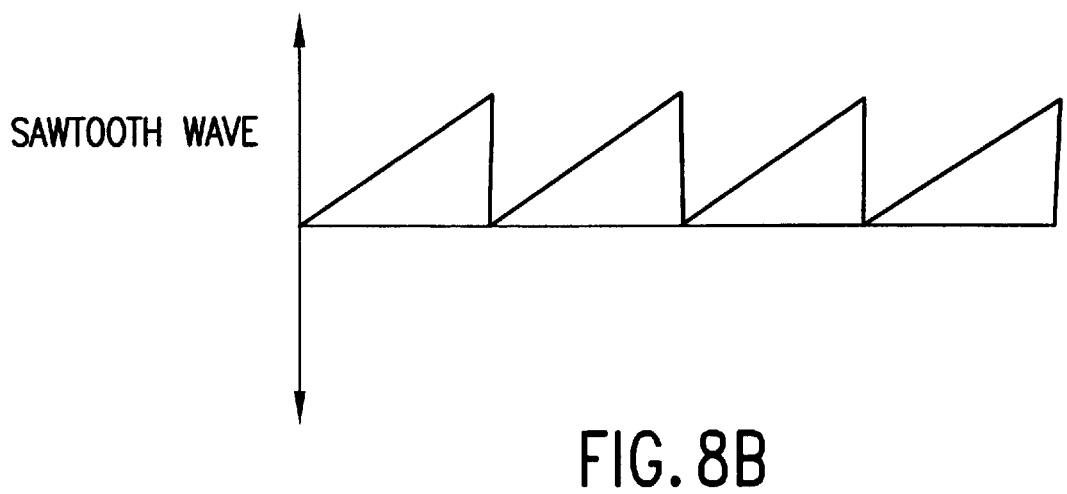
Figure 10:
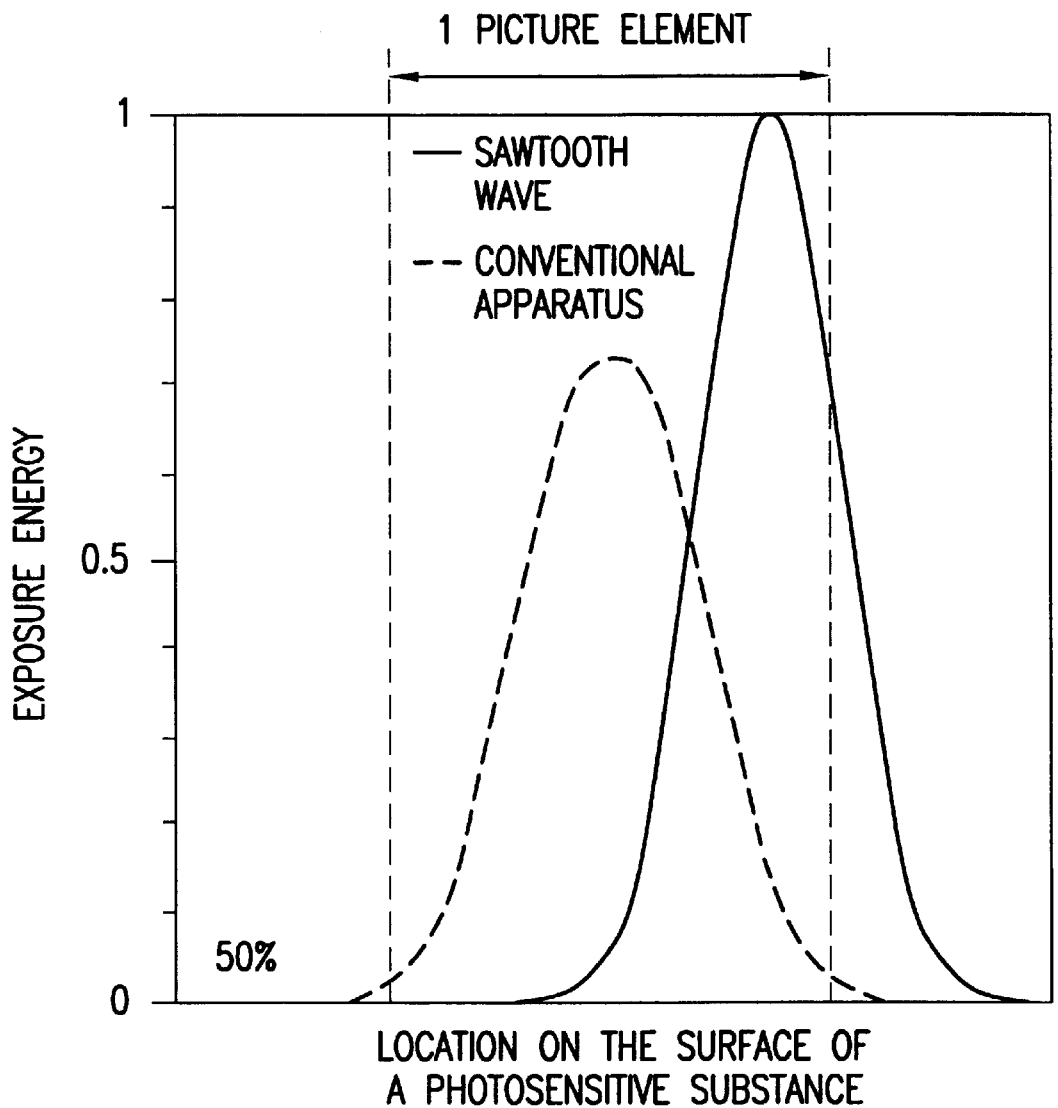
FIG. 10 is a diagram showing a distribution of exposure intensity of an image bearing body employed in the image forming apparatus employing the image drawing control unit shown in FIG. 7.

If a sawtooth wave shown in FIG. 8B is generated by the chopping-wave generator 42, on the other hand, the distribution of the exposure intensity of the image bearing body has a sharp peak on the rear part of each picture element as shown in FIG. 10. Even if such a control wave is used, a dot in a picture element is also independent of dots in other picture elements, resulting in a small amount of mutual interference among picture elements as well. As a result, an image with good reproducibility of intermediate gradations and thin lines can be produced.

In addition, in the case of this image forming apparatus, the chopping wave is synchronous with the clock signal. Thus, it is no longer necessary to resynchronize the driving current wave for the image bearing body with the clock signal, allowing a relatively sharp distribution of the exposure intensity with almost no need to increase the number of components.

Figure 11:
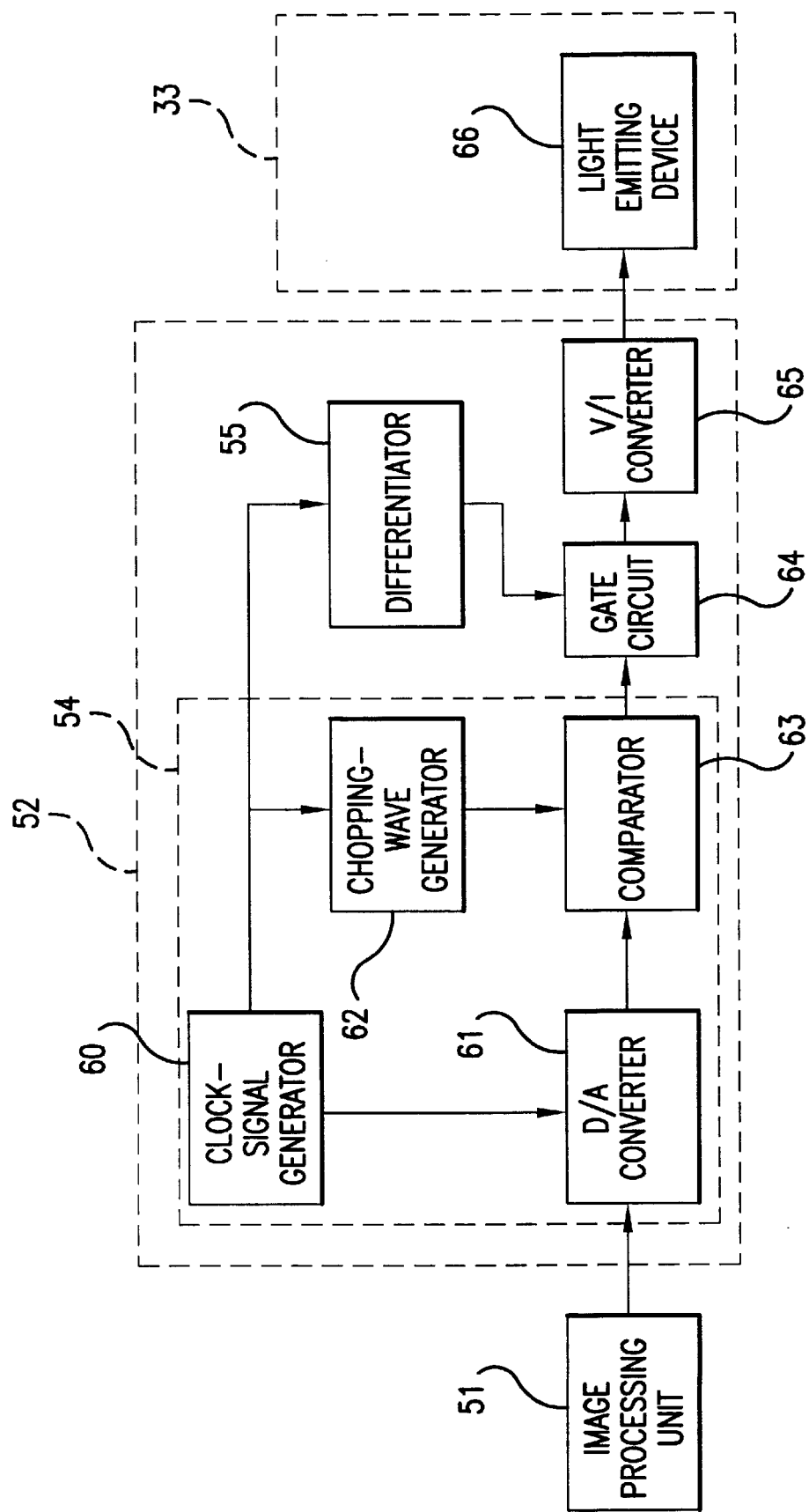
FIG. 11 is a block diagram showing an image drawing control unit employed in an image forming apparatus provided by a third embodiment of the present invention.

FIG. 11 is a block diagram showing an image drawing control unit 52 employed in an image forming apparatus provided by a third embodiment of the present invention.

Figure 12A:
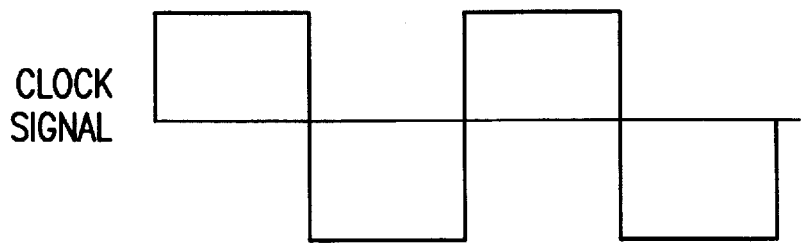
FIGS. 12A to 12D are diagrams each showing an output control wave to be applied to a light emitting device employed in the image forming apparatus shown in FIG. 11.
Figure 12B:
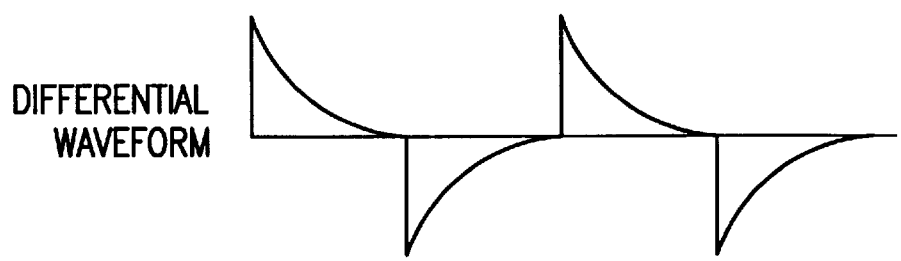

In this image forming apparatus, a differentiator 55 is employed for generating a predetermined differential wave in synchronization with a clock signal generated by a clock-signal generator 60 in place of the output-control-wave generating means 5 employed in the image drawing control unit 2 shown in FIG. 1. The differentiator 55 converts a clock signal shown in FIG. 12A into a differential wave like one shown in FIG. 12B by means of a differential circuit. The differential wave is then rectified by taking only the absolute values thereof to produce a rectified wave like one shown in FIG. 12C. The rectified wave is used as a control output wave.

As shown in FIG. 11, the image drawing control unit 52 comprises exposure control means 54, a gate circuit 64 and a V/I converter 65 for converting a signal output by the gate circuit 64 into a driving current wave in addition to the differentiator 55. The gate circuit 64 and the V/I converter 65 have the same configurations as those shown in FIG. 1. The exposure control means 54 comprises a D/A converter 61, a chopping-wave generator 62 and a comparator 63 which also have the same configurations as those shown in FIG. 1 in addition to the clock-signal generator 60. The chopping-wave generator 62 is set to generate a sawtooth wave like one shown in FIG. 12D.

It should be noted that the remaining configuration of the image forming apparatus is the same as that shown in FIG. 1.

In this image forming apparatus, first of all, an image signal output by an image processing unit 51 is converted into an analog image signal by the D/A converter 61. At the same time, the chopping-wave generator 62 generates a sawtooth wave in synchronization with a clock signal output by the clock-signal generator 60. The analog image signal is compared with the sawtooth wave by the comparator 63 to produce an exposure control signal with pulse widths each representing an amount of exposure.

Figure 12C:
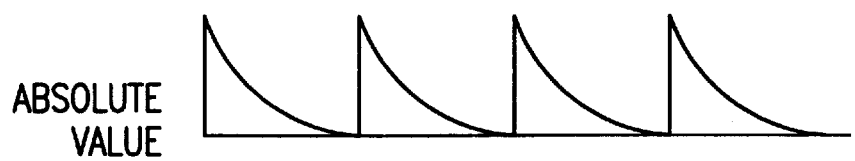
Figure 12D:
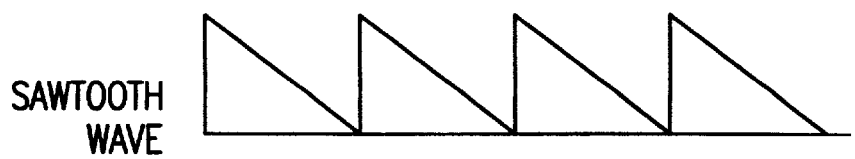

In addition, the differentiator 55 outputs the differential wave of the clock signal as an output control wave as shown in FIG. 12C. The differential wave is turned on and off by the gate circuit 64 with timing determined by the exposure control signal produced by the comparator 63. The output control wave produced by the gate circuit 64 is then converted by the V/I converter 65 into a driving current wave for driving a light emitting device 66.

Figure 13:
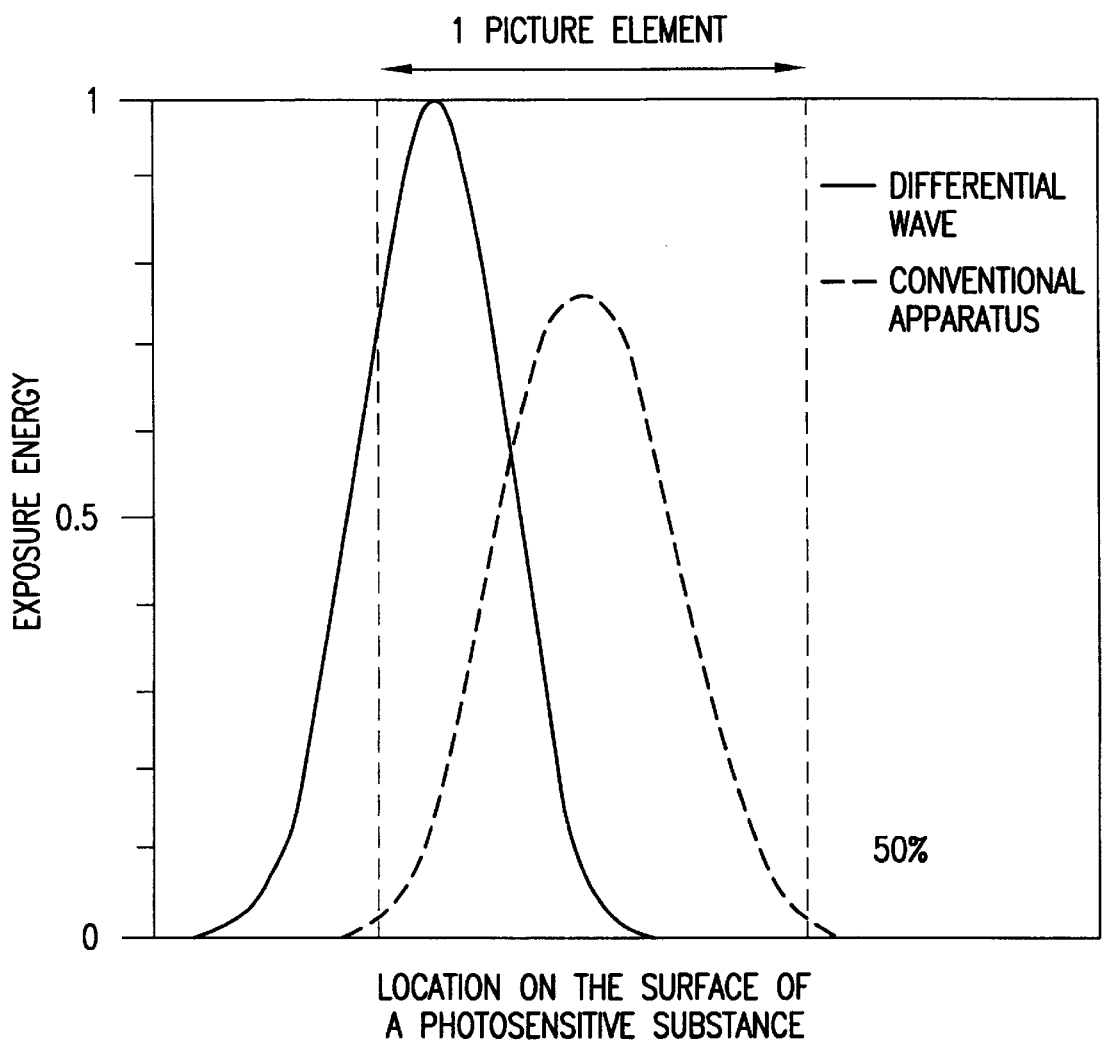
FIG. 13 is a diagram showing a distribution of exposure intensity of an image bearing body employed in the image forming apparatus employing the image drawing control unit shown in FIG. 11.
Figure 14:
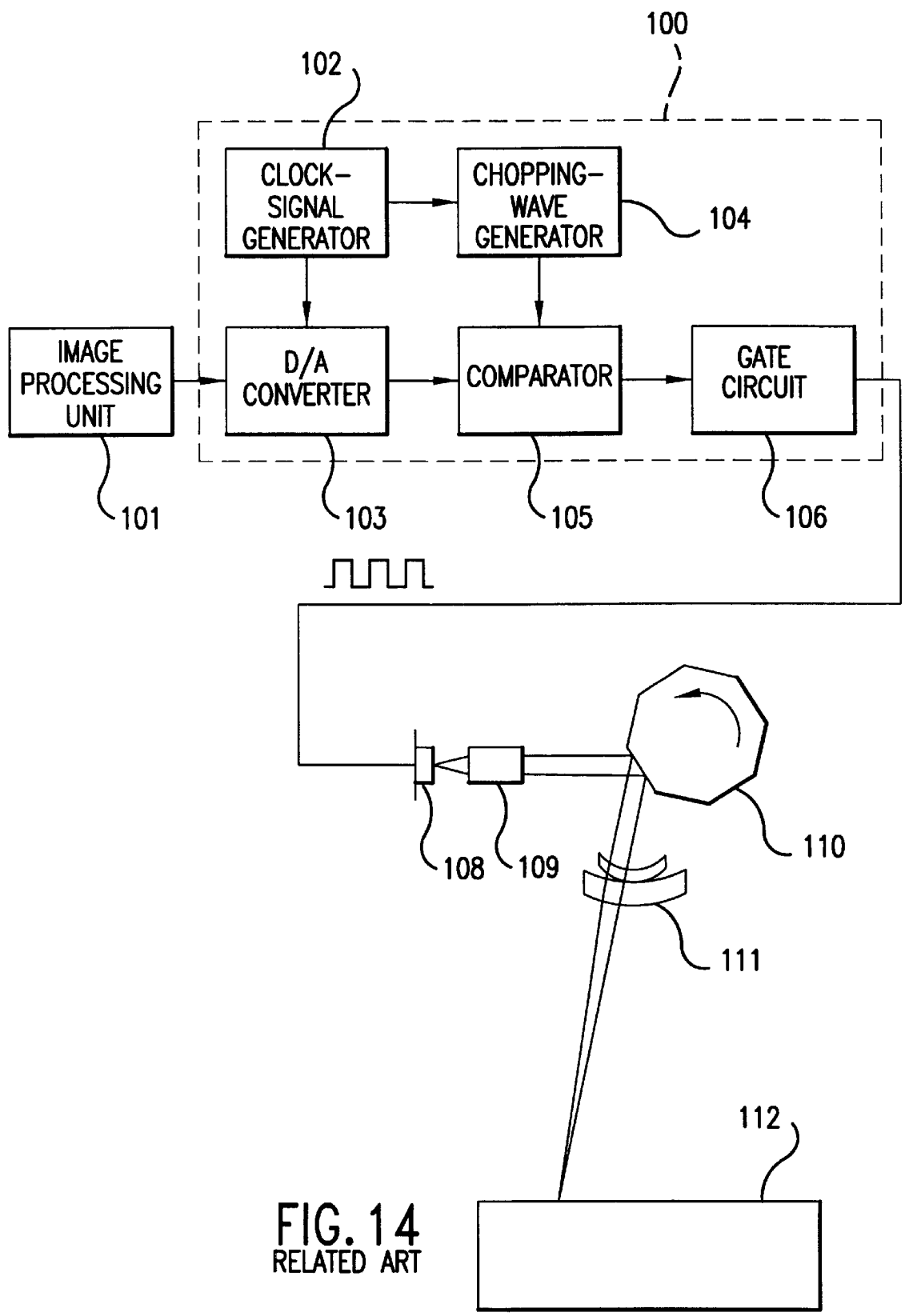
FIG. 14 is a block diagram showing a typical image drawing unit employed in a conventional image forming apparatus.
Figure 15A:
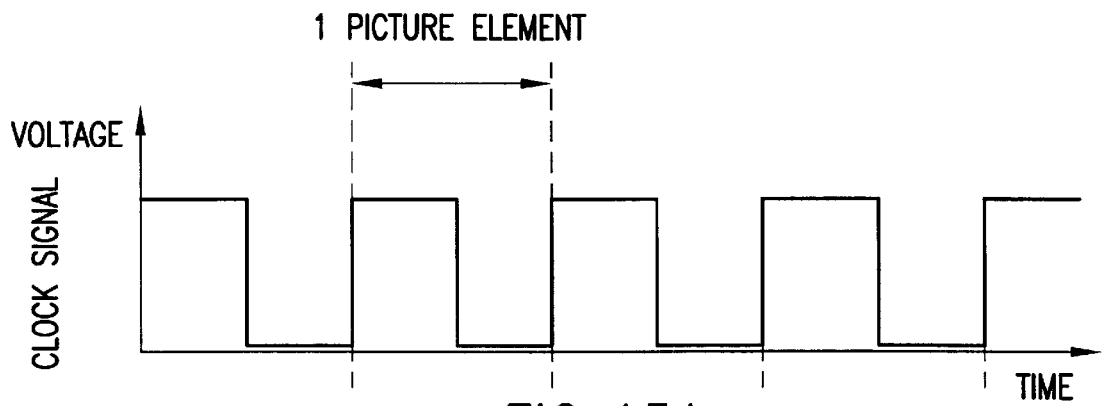
FIGS. 15A to 15C are diagrams showing a clock signal, an exposure control signal and a driving current wave for a light emitting device employed in the image drawing unit shown in FIG. 14.
Figure 15B:
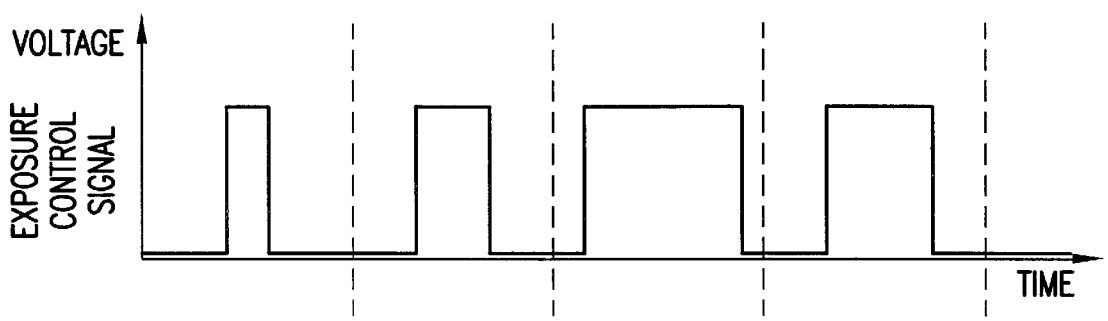
Figure 15C:
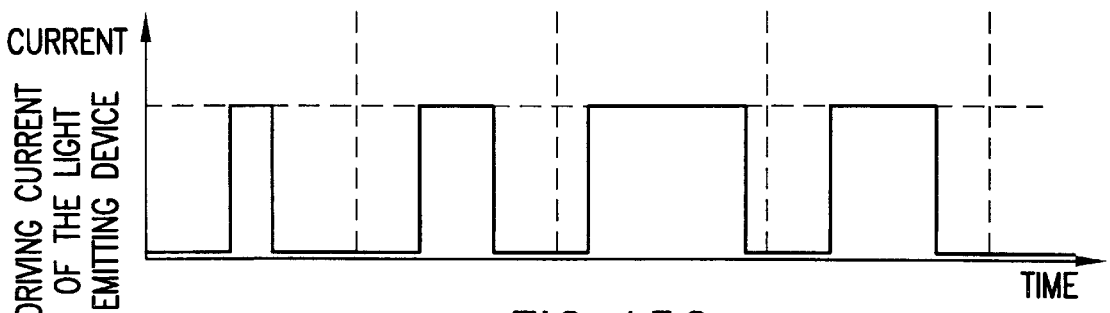
Figure 16:
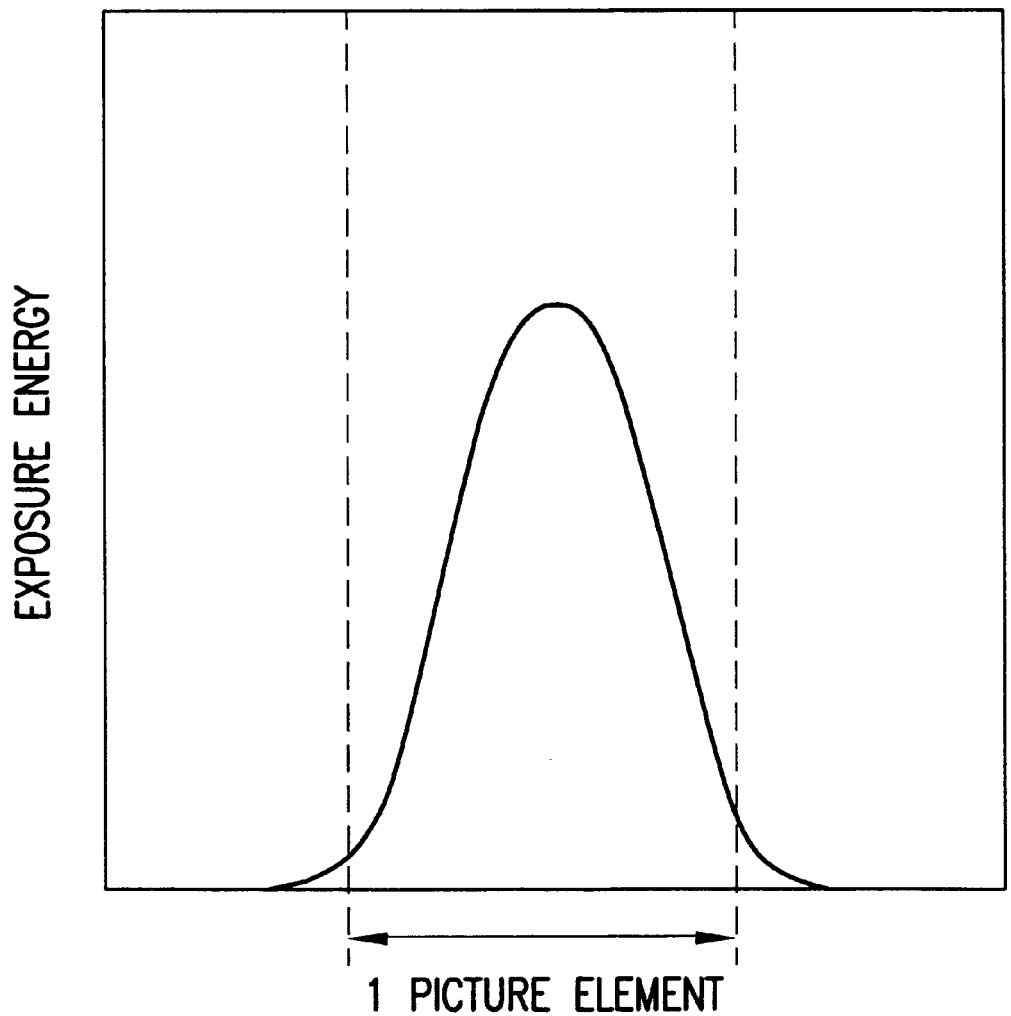
FIG. 16 is a diagram showing a distribution of exposure intensity of an image bearing body employed in the image forming apparatus employing the image drawing unit shown in FIG. 14.
Figure 17A:
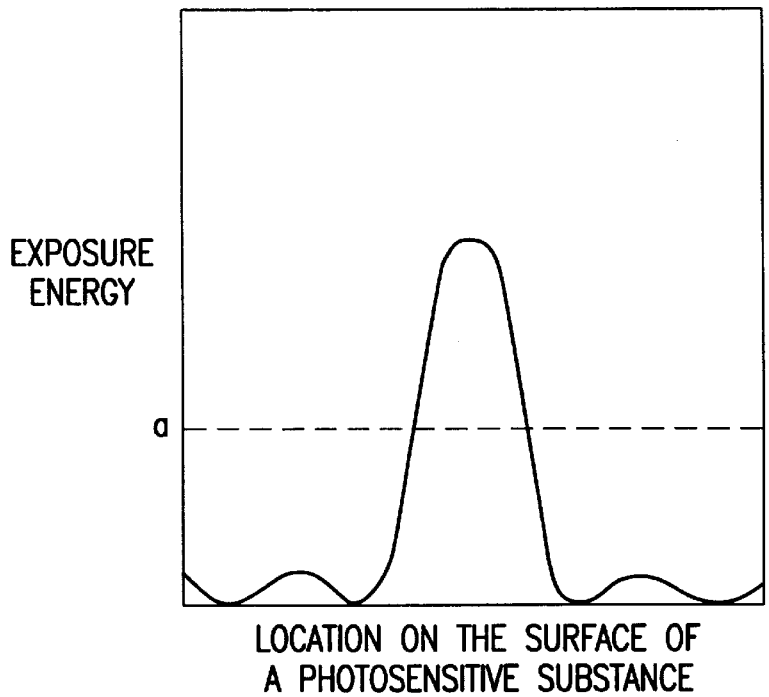
FIGS. 17A and 17B are diagrams showing a distribution of exposure intensity of an image bearing body and a photoelectric characteristic of a photosensitive substance employed in another typical conventional image forming apparatus.
Figure 17B:
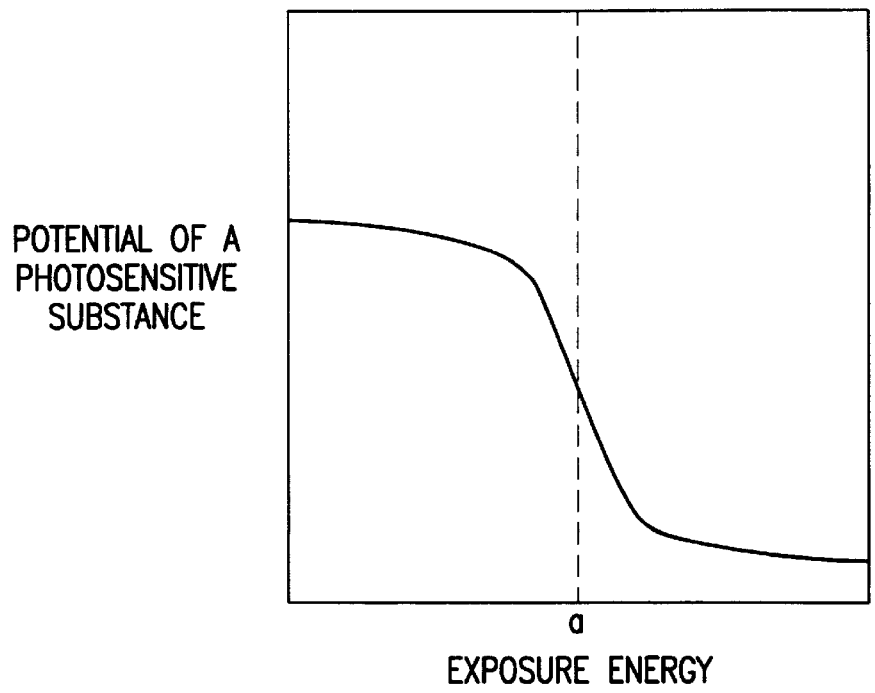
Figure 18:
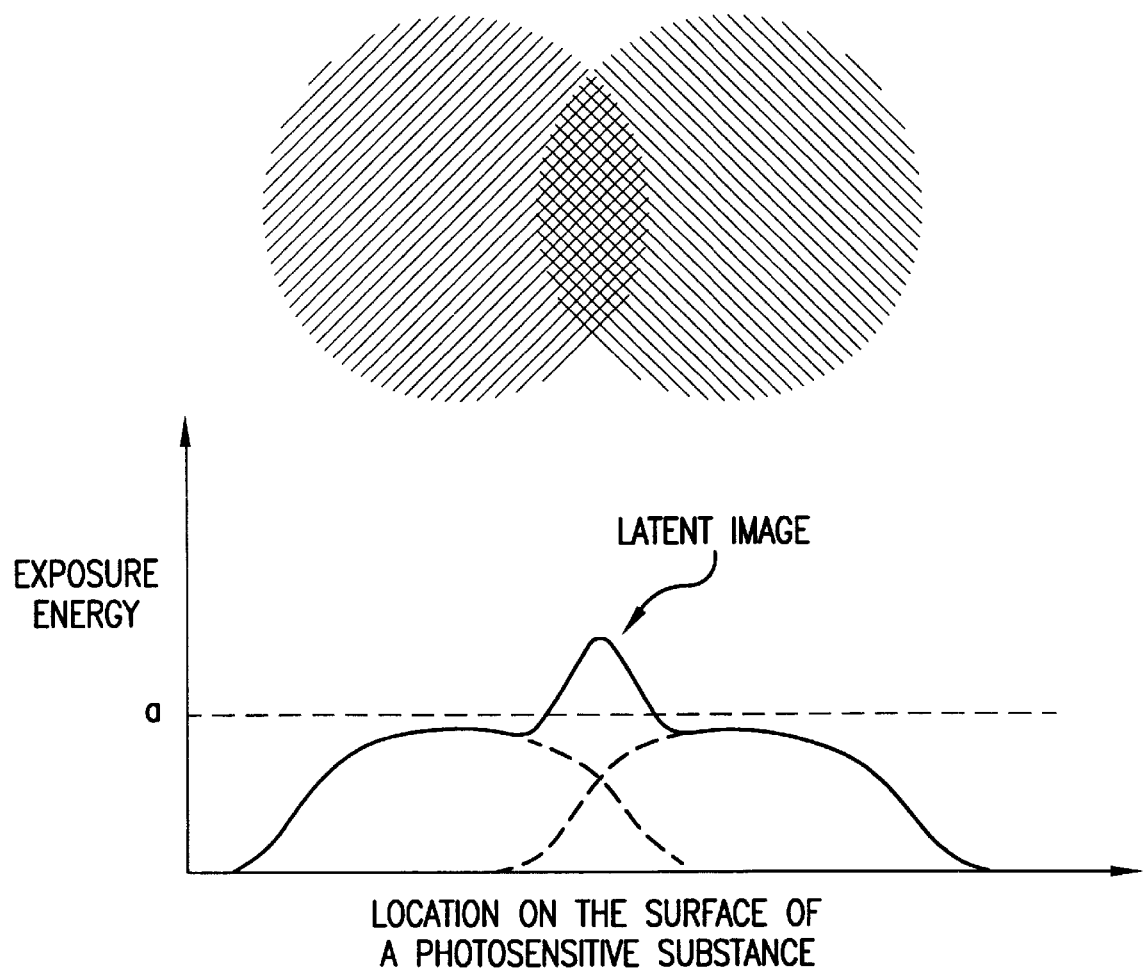
FIG. 18 is a diagram showing a distribution of exposure intensity of an image bearing body employed in still another typical conventional image forming apparatus.

Thereafter, the driving current wave is then supplied by the image drawing control unit 52 to an exposure control unit 33. Driven by the driving current wave, the light emitting device 66 employed in the exposure control unit 33 radiates a laser light. FIG. 13 is a diagram showing the distribution of the exposure intensity for the image bearing body employed in this image forming apparatus. As is obvious from the figure, the distribution of the exposure intensity with a sharp peak located at the front portion of each picture element is obtained in comparison with the conventional image forming apparatus. For this reason, a dot written on a picture element on the surface of the image bearing body is all but independent of dots on other picture elements, allowing the amount of mutual interference among adjacent picture elements to be reduced. In this way, a latent image can be formed clearly and distinctly. As a result, an image with good reproducibility of intermediate gradations and thin lines can be obtained.

As described above, according to the image forming apparatus and the image forming method, the use of a laser light even with the same beam diameter as the one of the conventional image forming apparatus makes it possible to obtain a distribution of the exposure intensity equivalent to that which would be obtained by using a laser light with a reduced beam diameter, preventing photographic fogs from being generated and the picture from deteriorating as a result of a side effect. As a result, an image with good reproducibility of intermediate gradations and thin lines can be produced. On the top of that, the desired effects can be realized by merely modifying the control circuit of the conventional image forming apparatus, allowing an increase in cost to be reduced to a minimum.

What is claimed is:

1. An image forming apparatus comprising:
    an image bearing body comprising a conductive layer and a photosensitive layer formed on said conductive layer;
    an electrical charging unit for electrically charging the surface of said image bearing body substantially uniformly;
    an image drawing unit for forming an electrostatic latent image on said image bearing body by scanning the surface of said image bearing body with a light beam modulated by an image signal for each picture element; and
    development means for making the electrostatic latent image visible by selectively transposing development agent onto said image bearing body,
    said image drawing unit comprising:
        output-control-wave generating means for generating a control wave having one peak in a write time of each picture element in a scanning operation with the light beam;
        exposure control signal generating means for generating an exposure control signal in accordance with the image signal, for each picture element;
        control signal generating means for generating an exposure intensity signal of each picture element, the control signal generating means modifying the control wave having one peak based on said exposure control signal to generate the exposure intensity signal; and
        converting means for converting said exposure intensity signal having said peak and said time duration into current signal for driving a light-emitting device.

2. An image forming apparatus according to claim 1, wherein said image signal conveys a concentration value for each picture element, and
    said exposure control means comprises:
        exposure-time-duration determining means for determining an exposure time duration for each picture element in accordance with the concentration value conveyed by the image signal for the picture element; and
        means for determining such write timing of said image drawing unit that each peak of the output control wave is placed in the exposure time duration determined by said exposure-time-duration determining means.

3. An image forming apparatus according to claim 1, wherein said image signal conveys a concentration value for each picture element, and concentration correcting means is provided for correcting the concentration value of the image signal.

4. An image forming apparatus according to claim 3, wherein said concentration correcting means makes exposure energy of the output control wave in the exposure time duration determined by said exposure-time-duration determining means equal to exposure energy of a constant output wave having no peak in the exposure time duration.

5. An image forming apparatus according to claim 4, wherein said concentration correcting means generates a reciprocal of a ratio of exposure energy of the output control wave in the exposure time duration determined by said exposure-time-duration determining means to exposure energy of a constant output wave having no peak in the exposure time duration for the concentration value of each picture element.

6. An image forming method comprising:
    a process of electrically charging the surface of an image bearing body comprising a conductive layer and a photosensitive layer formed on said conductive layer substantially uniformly;
    a process of forming an electrostatic latent image on said image bearing body by scanning the surface of said bearing body with a light beam modulated by an image signal for each picture element
    said process of forming an electrostatic latent image comprising:
        generating a control wave having one peak in a write time of each picture element;
        generating an exposure control signal in accordance with the image signal, for each picture element;
        generating an exposure intensity signal of each picture element by modifying the control wave having one peak based on said exposure control to generate the exposure intensity signal; and
        converting said exposure intensity signal having said peak and said time duration into current signal for driving a light-emitting device.

7. An image forming apparatus for forming an image having picture elements, the image forming apparatus comprising:
    exposure control means for setting an exposure time duration for each picture element in accordance with an inputted image signal for said picture element, said exposure control means comprising:
        an input port that inputs the image signal for each picture element;
        a chopping wave generator that generates a chopping wave having one pulse for each picture element, and
        a comparator that compares the image signal from the input port and the pulse from the chopping wave generator for outputting for each picture element an output pulse having a predetermined level and a width modulated by the image signal;
        an output control wave generating circuit that generates an output control wave having one peak for each picture element;
        an image drawing unit that forms a latent image on an image bearing body by scanning the surface of said image bearing body with a light beam modulated by a driving current;
        a gate circuit that receives the output pulse from the comparator and the output control wave and outputs the output control wave during the time duration of the output pulse from the comparator for said picture element; and a converter that converts the control wave output by said gate circuit into a driving current wave for driving a light emitting device for generating the light beam, the driving current wave having, for each picture element, an exposure time duration equal to the time duration of the output pulse from the comparator for said picture element and one peak in the write time of said picture element.

8. An image forming apparatus according to claim 7, wherein said image signal conveys a concentration value for each picture element.

9. An image forming apparatus according to claim 8, wherein concentration correcting means is provided for correcting the concentration value of the image signal.

10. An image forming apparatus according to claim 7, wherein the output control wave generating means generates an output control wave having one sharp peak during each exposure time duration.

11. An image forming apparatus according to claim 7, wherein the output control wave generating means generates an output control wave having, during each exposure time duration, one increasing portion during which the energy of the output control wave is strictly increasing and one decreasing portion during which the energy of the output control wave is strictly decreasing, the increasing and the decreasing portion intersecting at the peak.

12. An image forming method for forming an image having picture elements, the image forming method comprising:

setting an exposure time duration with an exposure control means, the exposure time duration for each picture element being set in accordance with an inputted image signal for said picture element, by:

inputting the image signal for each picture element with an input port, generating a chopping wave with a chopping wave generator, the chopping wave having one pulse for each picture element, and comparing, with a comparator, the inputted image signal and the pulse of the chopping wave for outputting, for each picture element, an output pulse has having a predetermined level and a width modulated by the image signal;

generating an output control wave having one peak for each picture element with an output wave generating circuit;

forming, with a drawing unit, a latent image on an image bearing body by scanning the surface of said image bearing body with a light beam modulated by a driving current; and receiving the output pulse from the comparator and the output control wave with a gate circuit and outputting the output control wave during the time duration of the output pulse from the comparator for said picture element; and converting, with a converter, the control wave output by said gate circuit into a driving current wave for driving a light emitting device for generating the light beam, the driving current wave having, for each picture element, an exposure time duration equal to the time duration of the output pulse from the comparator for said picture element and one peak in the write time of said picture element.

13. An image forming method according to claim 12, wherein said image signal conveys a concentration value for each picture element.

14. An image forming method according to claim 13, the method further comprising a step of correcting the concentration value of the image signal.

15. An image forming method according to claim 12, wherein the step of generating the output control wave generates an output control wave having one sharp peak during each exposure time duration.

16. An image forming method according to claim 12, wherein the step of generating the output control wave generates an output control wave having during each exposure time duration one increasing portion during which the energy of the output control wave is strictly increasing and one decreasing portion during which the energy of the output control wave is strictly decreasing, the increasing and the decreasing portion intersecting at the peak.

* * * * *